No. 792,926. PATENTED JUNE 20, 1905.
L. QUIMBY.
FILTER.
APPLICATION FILED NOV. 17, 1904.
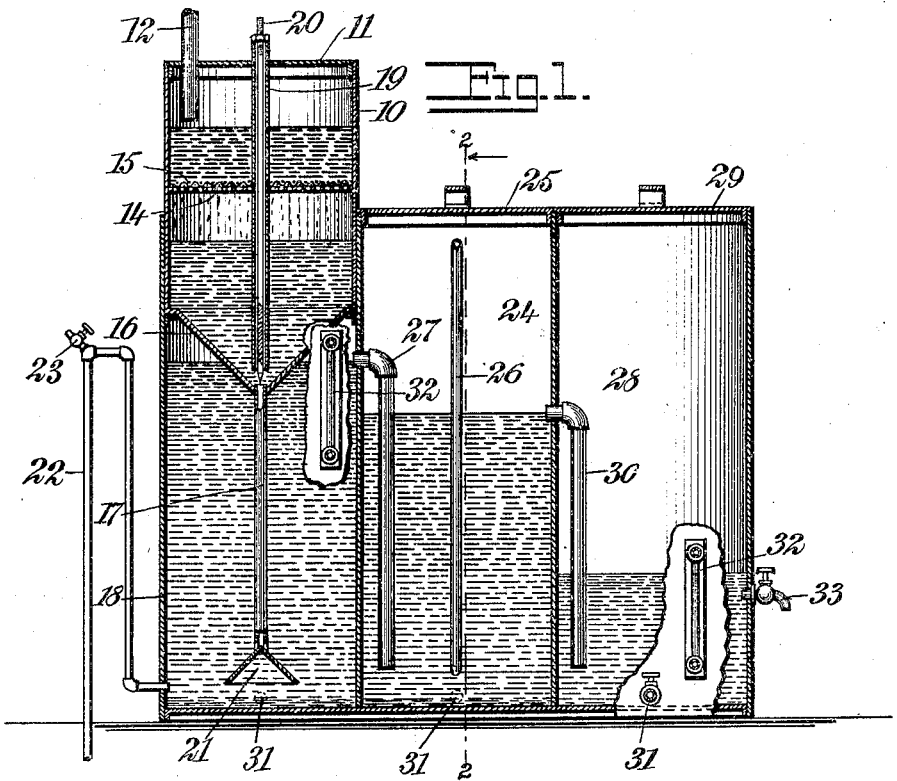
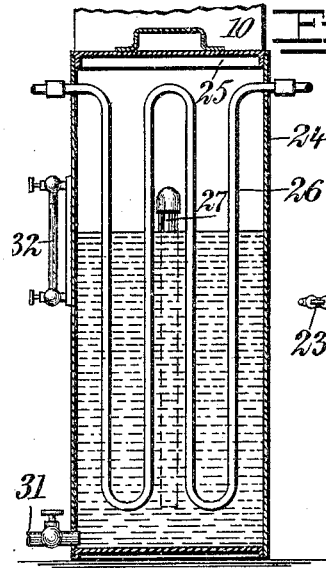
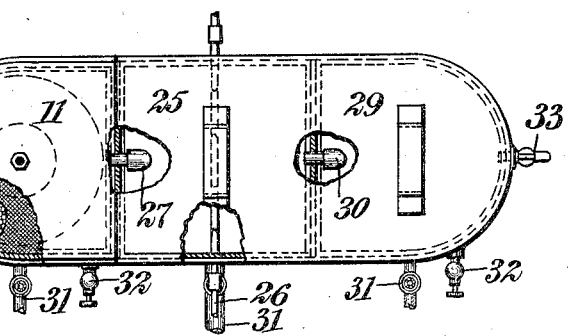
WITNESSES:
L. Almquist.
Isaac B. Owens
INVENTOR
Lewis Quimby
BY
ATTORNEYS No. 792,926.

Patented June 20, 1905.

UNITED STATES PATENT OFFICE.

LEWIS QUIMBY, OF YOUNGSTOWN, OHIO.

FILTER.

SPECIFICATION forming part of Letters Patent No. 792,926, dated June 20, 1905.

Application filed November 17, 1904. Serial No. 233,093.

*To all whom it may concern:*

Be it known that I, LEWIS QUIMBY, a citizen of the United States, and a resident of Youngstown, in the county of Mahoning and State of Ohio, have invented a new and Improved Filter, of which the following is a full, clear, and exact description.

The invention relates to a filter especially designed for cleaning oil, such as that collected from machine-bearings, thus enabling the oil to be used again.

Having in view a general improvement of these apparatus, my invention in its preferred embodiment provides a primarily-acting strainer for removing all coarse foreign matter, this strainer delivering the oil through a peculiar valve-controlled passage to a washer-chamber designed to contain water or other suitable cleaning liquid. The dirty oil passing through the water in the washer-chamber is partly cleansed of its impurities and is then discharged into a heater-chamber, where the temperature of the oil is raised to increase the fluidity of the oil, and thus facilitate the precipitation of any sediment remaining after the washing operation. Finally, a third chamber receives the oil from the heating-chamber, and from the third chamber the upper portions of the filtered oil may be withdrawn at will, leaving the sediment in the bottom. All of the chambers are provided with means for tapping off sediment from their bottoms, and the washer-chamber has a means for siphoning off any mixture of impure oil and water.

This specification is a precise description of the preferred embodiment of my invention, and in the claims I will define the true scope of the invention.

Reference is had to the accompanying drawings, which form a part of this specification, in which drawings like characters of reference indicate like parts in the several views, and in which—

Figure 1 is a vertical section of the complete apparatus with parts of the front side left intact to show particularly the oil-gages. Fig. 2 is a cross-section on the line 2 2 of Fig. 1, and Fig. 3 is a plan view with parts broken away to show the strainer and certain of the pipe connections.

10 indicates the strainer-chamber, which is provided with a cover 11 and may also be fitted with an inlet-pipe 12. Within the strainer-chamber is located a perforate partition 14, covered by a suitable strainer fabric 15. The oil introduced through the pipe 12 strikes the fabric 15 and partition 14 and percolates through the same into the lower part of the strainer-chamber. The bottom 16 of the strainer-chamber is conical, and an outlet-pipe 17 passes therefrom downward into the washer-chamber 18. Extending through the cover 11 and perforate partition 14 is a tube 19, which projects from the top of the cover 11 downward to the apex of the bottom 16 of the strainer-chamber 10. In this case is located a needle-valve 20, which commands the upper end of the outlet-pipe 17. At its lower end the outlet-pipe is provided with a conical spreader 21, the apex of which is located at the discharge end of the pipe. The oil passing through the strainer and down into the outlet-pipe 17 strikes the spreader 21 and is discharged at the lower edge thereof in a thin film.

The washer-chamber 18 is intended to be filled with water or other suitable washing liquid, and it is provided with a siphon 22, which passes from the bottom of the chamber, as illustrated. By means of the siphon the chamber 18 may be emptied at will. This siphon is provided with a vent 23, by means of which the siphon may be broken during the normal operation of the filter. The siphon 22 also serves to withdraw from the washer-chamber such parts of the washing liquid as may become mixed with impure oil. This relieves the apparatus of that oil which cannot be filtered.

Located alongside of the washer-chamber 18 is a heater-chamber 24, provided with a suitable cover 25 and having a steam or other heating fluid-coil 26 therein, by means of which the interior of the chamber is heated. 27 indicates a pipe adapted to lead the oil from the upper part of the washer-chamber into the lower part of the heater-chamber.

The final settling-chamber 28 is located alongside of the heater-chamber and has a cover 29, as shown. The oil is drawn from the upper part of the heater-chamber and delivered into the lower part of the settling-chamber by means of a pipe 30. Each of the chambers 18, 24, and 28 is provided with a means 31 for tapping off the impure matters which settle in the bottom of the chambers. The chambers 18 and 28 are also provided with gages 32, serving to indicate the height of the oil therein.

33 indicates a tap for withdrawing the purified oil from the chamber 28.

In the operation of the device the impure oil is delivered into the strainer-chamber 10 through the pipe 12 or through the open upper end of the chamber, as desired. The oil is allowed to strain through the partition 14 and fabric 15, and by regulating the needle-valve 20 the flow of the oil through the outlet-pipe 17 may be controlled. The strainer withdraws from the oil all foreign matter that may be in the oil, and from the straining-chamber the oil passes into the washer-chamber. Here the oil rises slowly through the body of water and is deprived of part of its impurities. The siphon 22 may be operated from time to time to withdraw the mingled oil and water, as before explained, and when the part of the purified oil reaches the pipe 27 it flows out of the same into the heater-chamber. In this chamber the temperature of the oil is raised to approximately 212° Fahrenheit, and in the fluid state incidental to this temperature the remaining impurities of the oil are quickly and thoroughly precipitated to the bottom of the heater-chamber. The purified oil runs off in the pipe 30 into the settling-chamber 18, and the upper portions of the oil therein being withdrawn the lower portions of the oil are left undisturbed, so that any sediment or impurity which may still remain in the oil will be allowed to settle in the bottom of this chamber. The taps 31 may be operated from time to time to clean out the chambers during the operation of the filter or the operation may be suspended and the entire apparatus cleaned at will.

Various changes in the form, proportions, and minor details of my invention may be resorted to at will without departing from the spirit and scope thereof. Hence I consider myself entitled to all such variations as may lie within the terms of my claims.

Having thus described the preferred form of my invention, what I claim as new, and desire to secure by Letters Patent, is—

1. An oil-filter comprising a strainer-chamber, a strainer in said chamber, a washer-chamber located below the strainer-chamber, the strainer-chamber having an outlet into the washer-chamber, a tube projecting downward through the strainer-chamber in immediate proximity to the outlet thereof, a needle-valve extending through the tube and commanding the outlet from the strainer-chamber, a heater-chamber juxtaposed to the washer-chamber, means for conducting the oil from the upper part of the washer-chamber to the lower part of the heater-chamber, means for heating the heater-chamber, a settler-chamber juxtaposed to the heater-chamber, and means for conducting the oil from the heater-chamber to the lower portion of the settler-chamber.

2. An oil-filter comprising a strainer-chamber, a strainer in said chamber, a washer-chamber located below the strainer-chamber, the strainer-chamber having an outlet into the washer-chamber, a tube projecting downward through the strainer-chamber in proximity to the outlet thereof, a valve having its stem extending through the tube, the valve commanding the outlet from the strainer-chamber, a heater-chamber juxtaposed to the washer-chamber, means for conducting the oil from the upper part of the washer-chamber to the lower part of the heater-chamber, means for heating the heater-chamber, a settler-chamber juxtaposed to the heater-chamber, and means for conducting the oil from the heater-chamber to the lower portion of the settler-chamber.

3. An oil-filter comprising a strainer-chamber, a strainer in the chamber intermediate the ends thereof, a washer-chamber below the strainer-chamber, a tube constituting the outlet from the strainer-chamber, said tube passing downward into the washer-chamber, a tube extending through the top of the strainer-chamber downward into proximity to the upper end of the first-named tube, a needle-valve extending through the second-named tube and commanding the upper end of the first-named tube, a heater-chamber juxtaposed to the washer-chamber, means conducting the oil from the upper part of the washer-chamber to the lower part of the heater-chamber, means for heating the heater-chamber, a settler-chamber juxtaposed to the heater-chamber, and means for conducting the oil from the heater-chamber to the lower portion of the settler-chamber.

In testimony whereof I have signed my name to this specification in the presence of two subscribing witnesses.

LEWIS QUIMBY.

Witnesses:
  W. C. CARMAN,
  H. O. BRIGGS.